May 19, 1953   H. F. PITCAIRN   2,638,990
AIRCRAFT SUSTAINING ROTOR BLADE WITH AIRFLOW CONTROL
Filed April 1, 1947
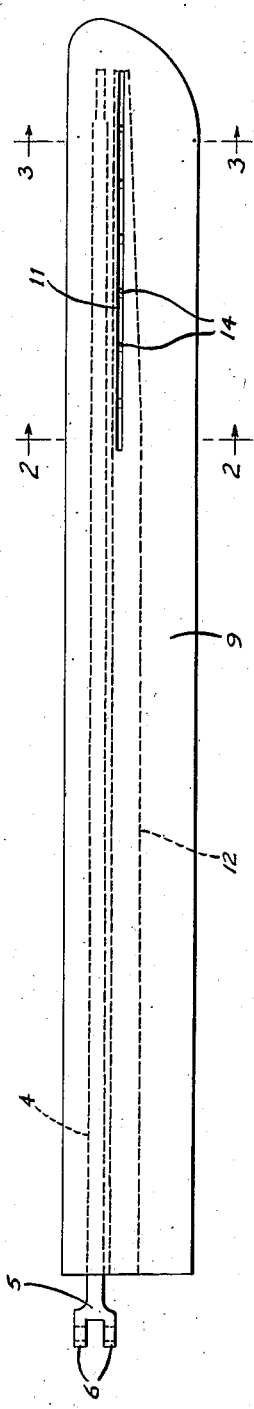
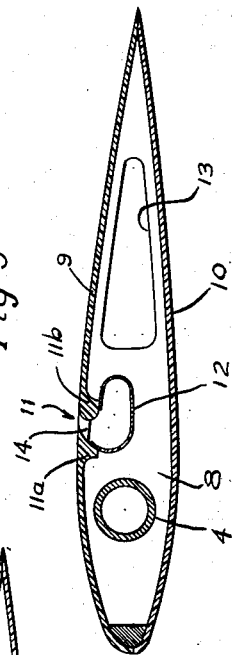
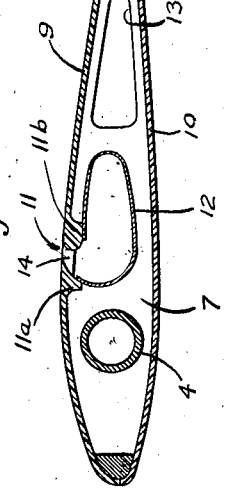
INVENTOR
Harold F. Pitcairn
BY
ATTORNEYS

Patented May 19, 1953

2,638,990

UNITED STATES PATENT OFFICE 2,638,990

AIRCRAFT SUSTAINING ROTOR BLADE WITH AIRFLOW CONTROL

Harold F. Pitcairn, Bryn Athyn, Pa., assignor to Autogiro Company of America, Philadelphia, Pa., a corporation of Delaware Application April 1, 1947, Serial No. 738,588

7 Claims. (Cl. 170—135.4)

This invention relates to rotative winged aircraft and is especially concerned with rotor blades for such aircraft.

Still more particularly, the invention has reference to a novel sustaining rotor blade having boundary layer or fluid flow control.

In rotative winged aircraft, and notably in aircraft of this type in which the rotor is power driven, for instance, in a helicopter, a tendency develops for the rotor blades to stall on the retreating side of the rotor at relatively high translational flight speeds, i. e., at that side of the rotor on which the blades move in a direction opposite to the direction of translational flight. This "tip stall" is disadvantageous aerodynamically and structurally. It decreases rotor efficiency and results in introduction of vibrations in the rotor and in the body of the aircraft, such vibrations being a source of discomfort to the occupants of the aircraft and also being detrimental to the structure, especially the structure of the blades themselves.

It is an object of the present invention to provide boundary layer control especially in the outboard region of the blades so as to reduce stalling in this region on the retreating side of the rotor at relatively high translational flight speeds.

By employing the arrangement of the invention a higher translational flight speed may be attained with a given rotational speed of the rotor without encountering tip stall; or, conversely, the rotor may be designed to rotate at a lower rate, without encountering tip stalling at any given speed of translational flight.

Beyond the foregoing the invention contemplates a novel system for setting up boundary layer control in the tip region of the blades, according to which the rotor blade is equipped with a longitudinally extending duct, the inner end of which is open and the outer end of which is slotted for discharge of air, whereby centrifugal pumping of the air in the duct when the rotor is rotating, serves as the source of air under pressure which is utilized for the boundary layer control.

In accordance with another aspect of the invention the air duct within the blade is tapered or of progressively decreasing cross-sectional area in the region from the inner end of the slot to the outer end thereof, the duct-taper desirably being arranged to provide for greater discharge of air through the slot in the outer portion thereof than in the inner portion. In this way more air is delivered to the outboard region of the blade where the tendency toward stalling is at a maximum.

How the foregoing and other objects and advantages are attained will appear more fully from the following description of the accompanying drawing illustrating one embodiment of the invention.

In the drawing—

Figure 1 is a plan view of a sustaining rotor blade constructed according to the invention; and Figures 2 and 3 are transverse sectional views of the blade taken respectively along the lines 2—2 and 3—3 on Figure 1.

The blade of the present invention is adapted to be used in the sustaining rotor of any rotative winged aircraft, whether the rotor is power driven or autorotationally actuated, or capable alternatively of either type of operation. The invention, however, is of especial advantage in a driven rotor. In a typical driven rotor a plurality of blades are mounted on a common hub by means of pivots, usually including at least a flapping pivot and frequently also a pitch change pivot. In the blade shown in Figure 1 the primary longitudinal structure of the blade comprises a tubular spar indicated at 4, advantageously a drawn steel tube. The inner end of the spar has a fitting 5 carrying apertured lugs 6 adapted to cooperate with a flapping pivot through which the blade is connected with the hub.

Although the blade may be of any desired plan form, the construction illustrated shows a blade having a substantially constant chord throughout its length.

The blade structure may be built up on and carried by the spar 4 in various ways, one advantageous form including a plurality of transverse ribs located at intervals throughout the length of the blade, two such ribs being shown at 7 and 8 in Figures 2 and 3. Each rib is apertured to pass the spar 4 and is secured thereto according to one or another of known techniques for this purpose.

The blade illustrated further comprises upper and lower blade surface or contour members 9 and 10 which may be of molded plastic or other sheet material, the two parts being secured together at the leading and trailing edges of the blade and also being secured to the transverse ribs. In the form shown, the upper surface member 9 is slotted in the outboard portion of the blade, as shown at 11, and a duct 12 for supplying air to the slot is extended throughout the length of the blade as appears in Figure 1, just behind the spar 4. The ribs, such as shown at 7 and 8, are cut out to pass the duct and thus serve to position the duct in the blade. The ribs may further be provided with cut-outs indicated at 13 to the rear of the duct in order to further lighten the structure of the blade.

Fore and aft of the slot 11 the upper contour member 9 of the blade is strengthened by thick portions 11a and 11b, and narrow transverse members 14 bridge the slot at spaced intervals. These may be molded in the portions 11a and 11b, and serve to strengthen the blade in the slotted region. The thickened portions 11a and 11b also serve for attachment of the edges of the duct 12 in the slotted region. With this arrangement and with the duct fitted in apertures in the blade ribs, the duct itself may be made of very light material such as sheet aluminum or thin plywood.

The duct 12 is open at the inner or root end of the blade and the air entering the inlet opening is caused to move outwardly under the influence of centrifugal force during rotation of the rotor, so as to build up an appreciable pressure for discharge of air through the slot 11.

As seen in Figure 1, in the region inboard of the slot 11, the duct 12 is formed to provide as large a cross-sectional area as feasible, in order to provide as large a volume of air as possible, at as low a velocity as possible, thereby reducing frictional losses to a minimum.

According to the invention, the cross-sectional area of the duct decreases from the inner end of the slot 11 to the outer end thereof. This will clearly appear from comparison of Figures 2 and 3, and is also shown in Figure 1. It is contemplated that at the outer end of the slot, the cross-sectional area of the duct may approach zero. By employing an appropriate decrease in cross-sectional area of the duct in the region of the slot, the air discharged through the slot may be distributed lengthwise of the slot in a manner to give a flow substantially proportionate to the amount required to effectively prevent stalling of the blade in all parts of the region during the retreating cycle. Thus it is contemplated that the decrease in cross-section of the duct be such as to provide delivery of more air through the outer portion of the slot than through the inner portion thereof.

In the preferred construction the slot is located chordwise of the blade in the neighborhood of 1/3 of the chord dimension from the leading edge.

Although the length of the slotted region may be greater or less than that indicated in Figure 1, and may also be differently positioned lengthwise of the blade, it is preferred that the slotted region should lie within the outer 1/4 of the blade length, since it has been found that it is in this region that tendency toward tip stall is most marked.

The location of the duct as close to the rear of the spar as possible is of advantage in maintaining a chordwise center of gravity location well forwardly in the blade section. The additional cut-outs indicated at 13 further serve to provide the desired forward location of the chordwise center of gravity. In a typical construction the chordwise center of gravity may thus be located at about 25% of the chord from the leading edge of the blade, and it is contemplated that the chordwise center of pressure and also the spar should lie approximately along this 25% line.

In considering the operation and advantages of the arrangement attention is called to the fact that the fluid flow control according to the invention is secured by delivering air under pressure through the top surface of the blade in the outer region, rather than by inducing an inflow of air through a slot. This is of particular advantage where the differential pressures are set up as a result of the centrifugal pumping action within the duct in the blade. Such pumping action, in rotors of contemplated size and rotational speed is capable of developing only a relatively limited pressure differential, and it has been found that with such a limited pressure differential much more effective boundary layer control is secured where the pressure is used positively (by forcing air out of the slot) rather than negatively (by drawing air into the slot).

It is further of importance in the arrangement shown and described that the slotted region is confined to about the outer 1/4 of the blade length, since in this way the inner 3/4 portion of the length of the duct is utilized to build up pressure to a significant value in the outer region of the blade where it is needed.

I claim:

1. An aircraft sustaining rotor blade comprising a main longitudinal spar extended throughout a major portion of the blade length and disposed well forwardly in the blade, blade surfacing defining the external contour thereof and being slotted toward the outer end of the blade in the upper surface thereof to deliver air to said upper surface, blade rib elements extended rearwardly of the spar within the blade surfacing, the rib elements being transversely apertured to the rear of the spar, and a duct extended through the rib apertures and having an air inlet toward the inner end of the blade and being in communication with the slotting of the blade surfacing to discharge air under pressure through said slotting.

2. An elongated aircraft sustaining rotor blade having means for mounting it for rotation, said blade comprising blade surfacing defining the external contour thereof and being slotted toward the outer end of the blade in the upper surface thereof, internal structure for supporting the blade surfacing including transverse blade rib elements having apertures aligned with each other lengthwise of the blade, and a duct extended lengthwise of the blade through said apertures, the duct being in communication with the slotting of the blade surfacing and being open toward its inner end to receive air at atmospheric pressure under the influence of the pumping action set up in the duct as a result of centrifugal force acting on the column of air in the duct during rotation of the rotor blade.

3. An elongated aircraft sustaining rotor blade having means for mounting it for rotation, said blade comprising blade surfacing defining the external contour thereof and being slotted toward the outer end of the blade in the upper surface thereof, internal structure for supporting the blade surfacing including transverse blade rib elements having apertures aligned with each other lengthwise of the blade, and an air pumping duct within the blade operative under the influence of the centrifugal force of rotation acting on the column of air therein for delivering air to and through said slotting, said duct being formed of thin sheeting material fitting the apertures of the rib elements and having its outer and inner ends respectively in communication with the slotting and with the atmosphere.

4. An elongated aircraft sustaining rotor blade of high aspect ratio, having at its root end a mounting device at about the quarter-chord position from the leading edge of the blade, and just aft of said device a duct extending throughout the major part of the blade length, said duct having an air inlet at its root end and being in communication with longitudinally-extended air discharge porting in an outer region of the blade length, the region of said porting being less than half said length, whereby the duct acts as a centrifugal pump, the said porting being open at the upper face of the blade near the one-third-chord position from the leading edge and having discharge-defining walls extending in an upward and rearward direction within the streamlined airfoil-defining surface of the blade.

5. The blade of claim 4 wherein the chordwise center of gravity of the blade is located between the leading edge and the duct.

6. The blade of claim 4 wherein the chordwise center of gravity of the blade is located at about the quarter-chord position from the leading edge.

7. The blade of claim 6 wherein a blade spar lies along said quarter-chord position and is secured to said mounting device.

HAROLD F. PITCAIRN.

References Cited in the file of this patent

UNITED STATES PATENTS

| Number | Name | Date |
| --- | --- | --- |
| 2,084,464 | Stalker | June 22, 1937 |
| 2,156,133 | Troller | Apr. 25, 1939 |
| 2,412,908 | Platt et al. | Dec. 17, 1946 |
| 2,429,646 | Pullin | Oct. 28, 1947 |
| 2,443,936 | Stalker | June 22, 1948 |
| 2,464,651 | Pecker | Mar. 15, 1949 |
| 2,464,726 | Stalker | Mar. 15, 1949 |
| 2,469,480 | Sikorsky | May 10, 1949 |

FOREIGN PATENTS

| Number | Country | Date |
| --- | --- | --- |
| 86,738 | Germany | May 2, 1896 |
| 497,048 | Great Britain | Dec. 12, 1938 |
| 557,011 | Great Britain | Nov. 1, 1943 |
| 807,110 | France | Jan. 5, 1937 |